(12) United States Patent
Johnson

(10) Patent No.: US 11,884,889 B2
(45) Date of Patent: Jan. 30, 2024

(54) KINETIC OIL PROCESSING SYSTEM

(71) Applicant: David Johnson, Cardston (CA)

(72) Inventor: David Johnson, Cardston (CA)

(73) Assignee: David Johnson, Cardston (CA)

( * ) Notice: Subject to any disclaimer, the term of this patent is extended or adjusted under 35 U.S.C. 154(b) by 0 days.

(21) Appl. No.: 18/041,360

(22) PCT Filed: Aug. 11, 2021

(86) PCT No.: PCT/US2021/045541
§ 371 (c)(1),
(2) Date: Feb. 10, 2023

(87) PCT Pub. No.: WO2022/035960
PCT Pub. Date: Feb. 17, 2022

(65) Prior Publication Data
US 2023/0295518 A1    Sep. 21, 2023

Related U.S. Application Data

(60) Provisional application No. 62/706,363, filed on Aug. 12, 2020.

(51) Int. Cl.
*C10G 9/08* (2006.01)
*C10G 1/00* (2006.01)
(Continued)

(52) U.S. Cl.
CPC .............. *C10G 9/08* (2013.01); *B01D 3/14* (2013.01); *B01J 19/28* (2013.01); *C10B 47/30* (2013.01);
(Continued)

(58) Field of Classification Search
CPC . C10G 9/08; C10G 1/002; C10G 1/02; C10G 55/04; C10G 57/00;
(Continued)

(56) References Cited

U.S. PATENT DOCUMENTS 5,681,452 A * 10/1997 Kirkbride ................ C10G 1/06
208/418
2008/0202985 A1    8/2008 Hatfield et al.
(Continued)

FOREIGN PATENT DOCUMENTS

WO    2022035960 A1    2/2022

OTHER PUBLICATIONS

Hanson et al. "Pyrolysis of oil sand from the Whiterocks deposit in a rotary kiln" Fuel, vol. 71 Issue 12 (Dec. 1992): pp. 1455-1463; entire document.
(Continued)

*Primary Examiner* — Randy Boyer
*Assistant Examiner* — Juan C Valencia
(74) *Attorney, Agent, or Firm* — Ryan L. Marshall; Payton DuBose; Barnes & Thornburg LLP

(57) ABSTRACT

A system for purifying petroleum or oil shale is provided. The system includes a pressurized cracking tank configured to receive petroleum or crushed oil shale; and a rotary kiln configured to receive product from the pressurized cracking tank. A method of processing petroleum or oil shale is also provided. The method includes feeding the petroleum or the oil shale into a pressurized cracking tank; heating the petroleum or the oil shale to withdraw oil vapors containing hydrocarbons; and feeding the petroleum or the oil shale from the pressurized cracking tank into a rotating kiln.

20 Claims, 5 Drawing Sheets

(51) Int. Cl.

| | |
|---|---|
| *C10G 1/02* | (2006.01) |
| *B01J 19/28* | (2006.01) |
| *C10G 55/04* | (2006.01) |
| *C10B 53/06* | (2006.01) |
| *C10B 55/00* | (2006.01) |
| *C10B 47/30* | (2006.01) |
| *B01D 3/14* | (2006.01) |
| *C10G 57/00* | (2006.01) |

(52) U.S. Cl.
 CPC .............. *C10B 53/06* (2013.01); *C10B 55/00* (2013.01); *C10G 1/002* (2013.01); *C10G 1/02* (2013.01); *C10G 55/04* (2013.01); *C10G 57/00* (2013.01); *C10G 2300/4012* (2013.01)

(58) Field of Classification Search
 CPC .... C10G 2300/4012; B01D 3/14; B01J 19/28; C10B 47/30; C10B 53/06; C10B 55/00
 See application file for complete search history.

(56) References Cited

U.S. PATENT DOCUMENTS

| | | |
|---|---|---|
| 2012/0318636 A1 | 12/2012 | Morris, Jr. et al. |
| 2016/0045841 A1* | 2/2016 | Kaplan .................. C01B 32/05 429/49 |
| 2016/0053184 A1 | 2/2016 | Wheeler et al. |
| 2017/0095790 A1 | 4/2017 | Wheeler |

OTHER PUBLICATIONS

PCT; App. No. PCT/US2021/045541; International Search Report and Written Opinion dated Nov. 23, 2021.

\* cited by examiner

KINETIC OIL PROCESSING SYSTEM

CROSS-REFERENCE TO RELATED APPLICATIONS

This application is a National Stage application of International Application No. PCT/US2021/045541 filed Aug. 11, 2021, which claims priority from U.S. Provisional Application No. 62/706,363, filed Aug. 12, 2020, the subject matter of these applications are incorporated herein by reference in their entirety.

BACKGROUND

1. Field of the Invention

The present disclosure generally relates to processing petroleum or oil shale. More particularly the disclosure relates to a system and method for processing petroleum or oil shale into useful products.

2. Description of the Related Art

Crude petroleum and oil shale reserves are massive, but processes for extracting useful products from petroleum or oil shale require significant amounts of energy and time.

Oil shale reserves are massive, and combustible hydrocarbons can be extracted. Oil shale and tar sands, also known as oil sands and bituminous sands, are particularly promising sources of these needed products as large deposits are found in Canada and the United States. However, high processing costs limit the development of oil shale reserves. Thus, more efficient and effective processing systems could make oil shale reserves more appealing sources of hydrocarbons when oil prices are relatively low.

BRIEF SUMMARY

A system for processing petroleum or oil shale is provided. The system includes a pressurized cracking tank configured to receive petroleum or crushed oil shale; and a rotary kiln configured to receive product from the pressurized cracking tank.

In some aspects, the system includes one or more distillation columns having a top portion and a bottom portion, wherein the distillation column is configured to receive product from the rotary kiln at the top portion.

In some aspects, the distillation column is on a 20 to 80 degree angle.

In some aspects, the distillation column is on a 45 degree angle.

In some aspects, the system includes one or more catalytic reforming units configured to receive product from the distillation column.

In some aspects, the one or more catalytic reforming units comprise a rotating drum that is configured to receive product from the distillation column and compressed air.

In some aspects, the system includes a rod mill, a ball mill, or a sag mill connected to an inlet of the pressurized cracking tank.

In some aspects, a mixer is positioned between the rod mill, a ball mill, or a sag mill and the inlet of the pressurized cracking tank.

In some aspects, a conduit connects the pressurized cracking tank and the rotary kiln, wherein the conduit is a triangle pipe or a square pipe.

In some aspects, the conduit comprises a top and a bottom, and the conduit is heated on the bottom.

In some aspects, the bottom of the conduits are heated from exhaust product streams.

In some aspects, the pressurized cracking tank and the rotary kiln are at least partially encased in a thermal insulator.

In some aspects, the conduits are at least partially encased in a thermal insulator.

In some aspects, the thermal insulator is kyanite or mullite.

In some aspects, the pressurized cracking tank comprises exhaust valves to control flow of vapor out of the pressurized cracking tank.

A method of processing petroleum or oil shale is provided. The method includes feeding the petroleum or the oil shale into a pressurized cracking tank; heating the petroleum or the oil shale to withdraw oil vapors containing hydrocarbons; and feeding the petroleum or the oil shale from the pressurized cracking tank into a rotating kiln.

In some aspects, the method includes removing the petroleum or the oil shale from the kiln and feeding the petroleum or the oil shale into distillation column.

In some aspects, the method includes feeding a stream from the distillation column into a catalytic reforming unit.

In some aspects, a conduit connecting the pressurized cracking tank and the rotary kiln is a triangle pipe or a square pipe.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
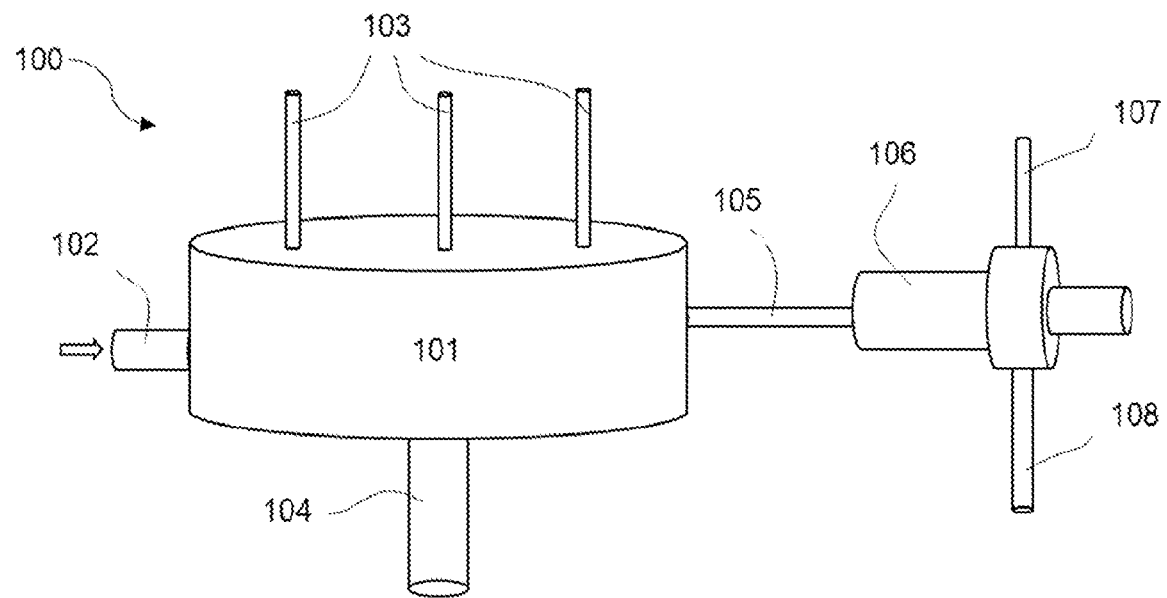
FIG. 1 shows an embodiment of the kinetic oil processing system.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

A system for purifying petroleum or oil shale is provided. The system includes a pressurized cracking tank configured to receive petroleum or crushed oil shale; and a rotary kiln configured to receive product from the pressurized cracking tank.

Figure 2:
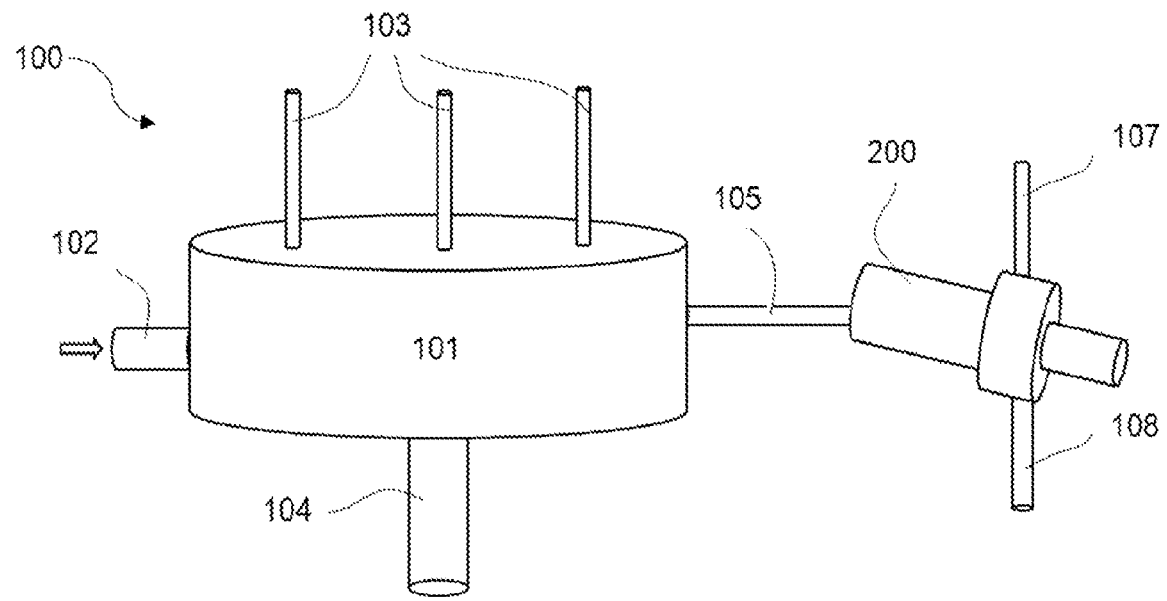
FIG. 2 shows an embodiment of the kinetic oil processing system having a tilted kiln.

An embodiment of the system 100 is shown in FIGS. 1-2. FIG. 1 shows a pressurized cracking tank 101 having a feed line 102 that carries unrefined petroleum or oil shale into the tank 101, exhaust lines 103 that remove hydrocarbon vapors from the tank 101, a recirculation line 104 that removes unvaporized petroleum or oil shale from the tank 101. The pressurized cracking tank 101 enables fast heating of the petroleum or oil shale. Cooking the petroleum or oil shale in the tank 101 may proceed over a span of about 30-45 minutes. The exhaust lines 103 remove lighter product at the top of the tank 101. The recirculation line 104 allows for the heavier elements of sludge to dissipate quickly and be removed early on in the process. The sludge is removed through the recycling line 104 to further remove any remaining useable product. The tank 101 are low profiled allowing for greater surface area coverage for the bottom heated surface The pressurized cracking tank 101 is connected to a rotary kiln feed line 105 that carries product to the rotary kiln 106. The rotary kiln 106 may have a rotary kiln exhaust line 107 and a rotary kiln heavy line 108.

FIG. 2 shows an embodiment where the pressurized cracking tank 101 is connected to a tilted rotary kiln 200. The angle of the kiln 200 facilitates movement of the petroleum or oil shale through the kiln 200.

The petroleum products are separated according to predetermined criteria, such as weight, type, and use. It is preferred, but not in all instances essential, that this distillation and cracking of extracted hydrocarbons be performed on site at the kilns, and immediately while the oil vapors containing those extracted hydrocarbons emerging from pyrolysis remain hot.

Each such kiln includes an elongated rotating drum having an input end for receiving oil shale and an output end that is disposed lower than the input end. Preferably, a plurality of such kiln lines is disposed in convenient proximity in a kiln array. The kiln lines in a kiln array are so connected to sources of oil shale and fuel as to permit simultaneous, parallel advancement of oil shale through each individual kiln line. A preferred kiln array thus includes two, three, or even more such parallel-connected kiln lines.

In the pre-heat kiln a temperature is maintained in a range of from about 300° F. to about 500° F., more narrowly in a range of from about 350° F. to about 450° F., and most specifically at about 400° F.

Figure 3:
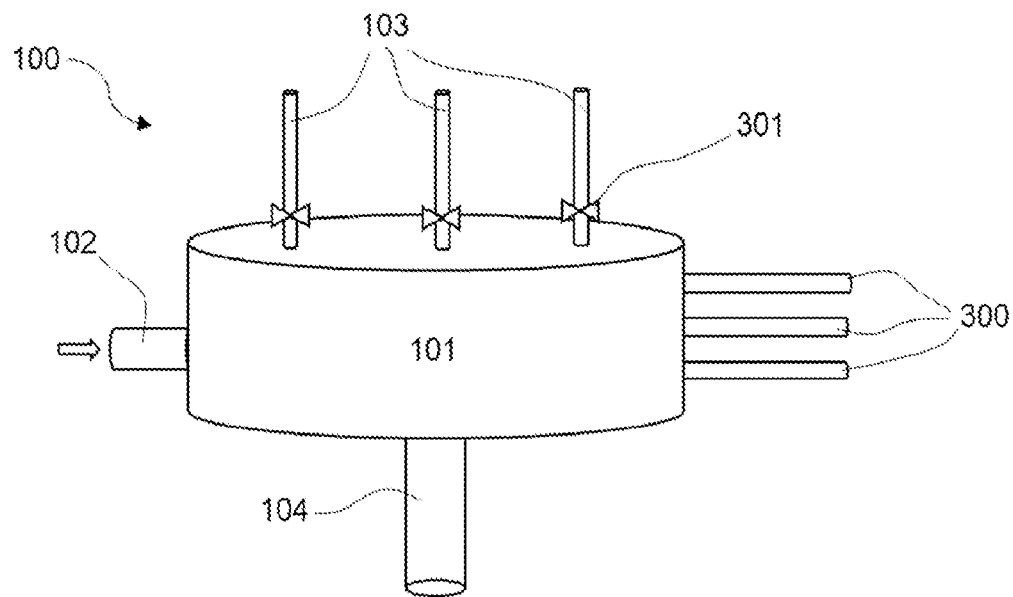
FIG. 3 shows an embodiment of the kinetic oil processing system where the pressurized cracking unit has several product streams.

FIG. 3 shows an embodiment of the system where the pressurized cracking tank 101 has a plurality of streams 300 that remove lighter product at the top of the tank 101 and heavier product at the bottom. Each layer is vacuumed and screened to be moved on to the next stage. Exhaust valves 301 are opened at the end of the cook cycle to allow for usable product to be extinguished and the rest of the product moves on to the next stage.

Figure 4:
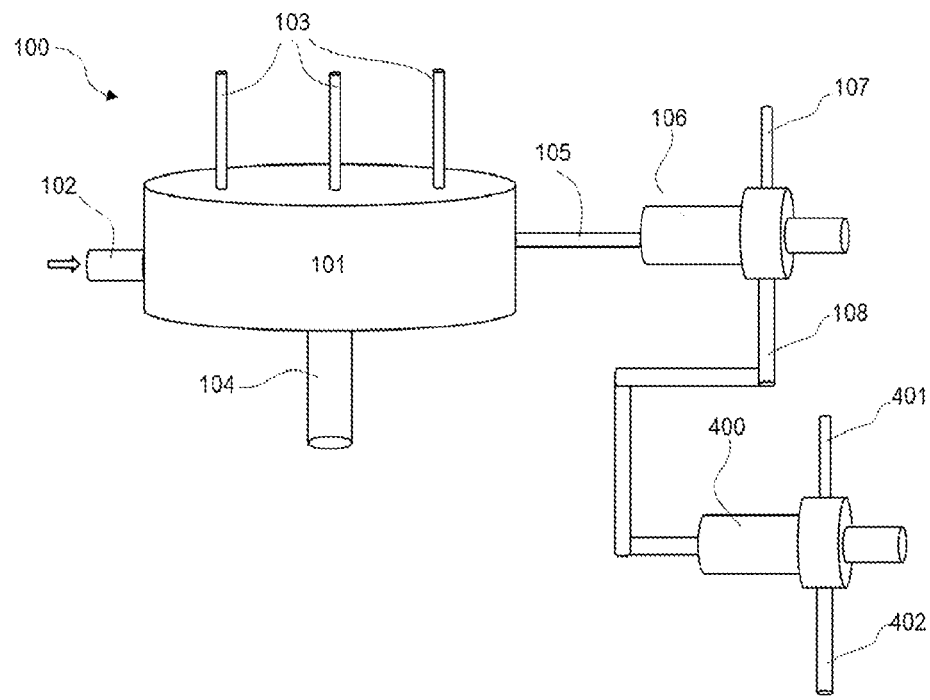
FIG. 4 shows an embodiment of the kinetic oil processing system with at least two kilns.

FIG. 4 shows an embodiment of the system where the pressurized cracking tank 101 is connected to a series of rotary kilns (106 and 400). The rotary kiln heavy line 108 may feed heavier hydrocarbons to a second rotary kiln 400. Lighter products are removed from line 401 and heavier products are removed through line 402. Line 402 may feed heavier product into a third kiln (not pictured).

Figure 5:
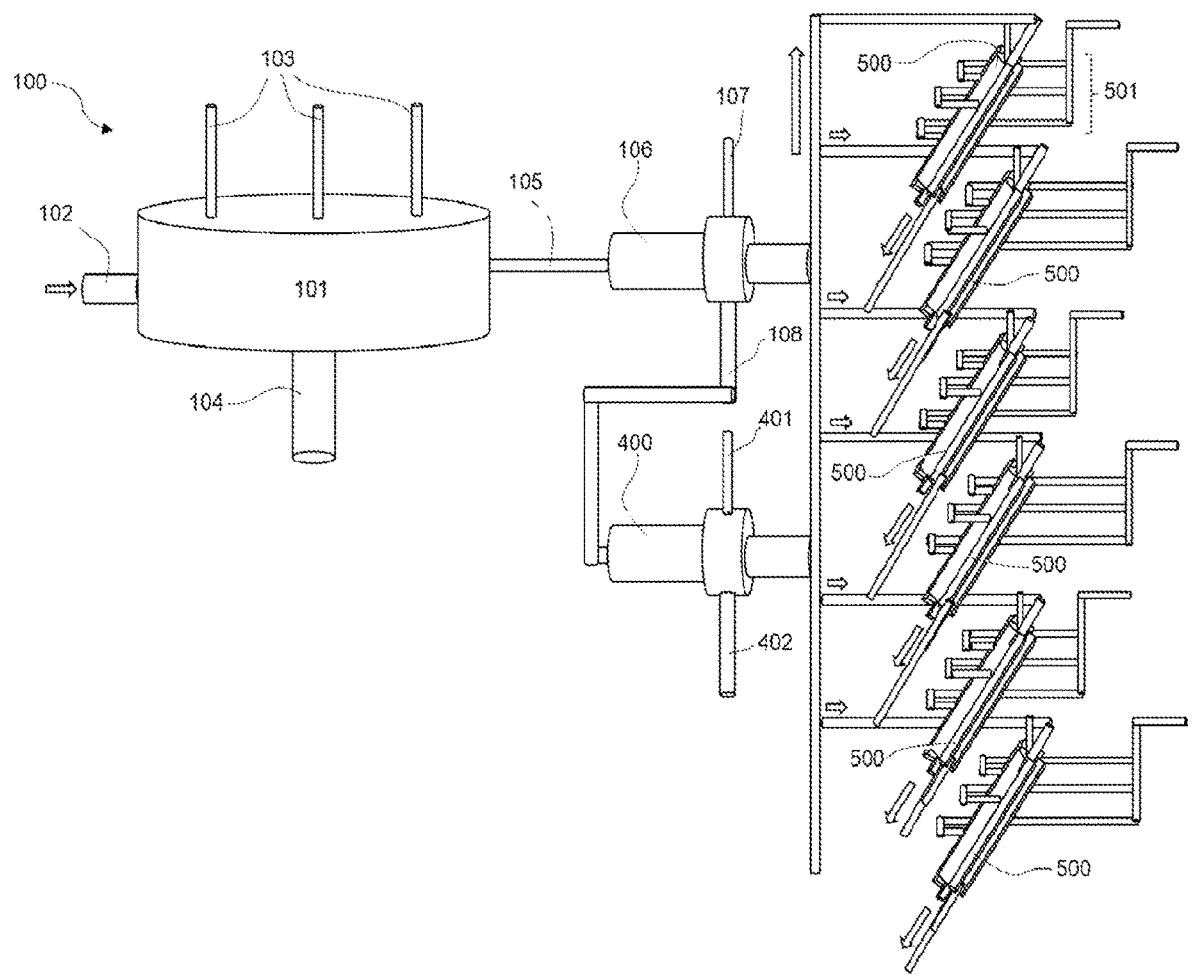
FIG. 5 shows an embodiment of the kinetic oil processing system with a series of distillation columns.

FIG. 5 shows an embodiment of a system where the rotary kiln (107 and 400) is connected to at least one distillation column 500. Lighter products accumulate and exit the distillation columns at the top of the series and heavier products exit the distillation columns at the bottom of the series. Each distillation column 500 may have stages 501, each of which removes different products or different mixtures of products. In some aspects, the system includes one or more distillation columns having a top portion and a bottom portion, wherein the distillation column is configured to receive product from the rotary kiln at the top portion.

In some aspects, the distillation column is on a 20 to 80 degree angle. In some aspects, the distillation column is on a 25 degree, 30 degree, 40 degree, or 45 degree angle. Preferably, the distillation column is on a 45 degree angle.

A distillery column on a 45 degree angle may rotate internally like a kiln with mixing fins inside of the internal column. The rotation element helps to expedite the distillation process. The fins in the column act as a mixer to enhance the churn cycle. Then fast boil the product to 900° F., allowing half hour settling time then open the first valve—drain to empty, then second valve drain to empty, then third valve drain to empty.

Figure 6:
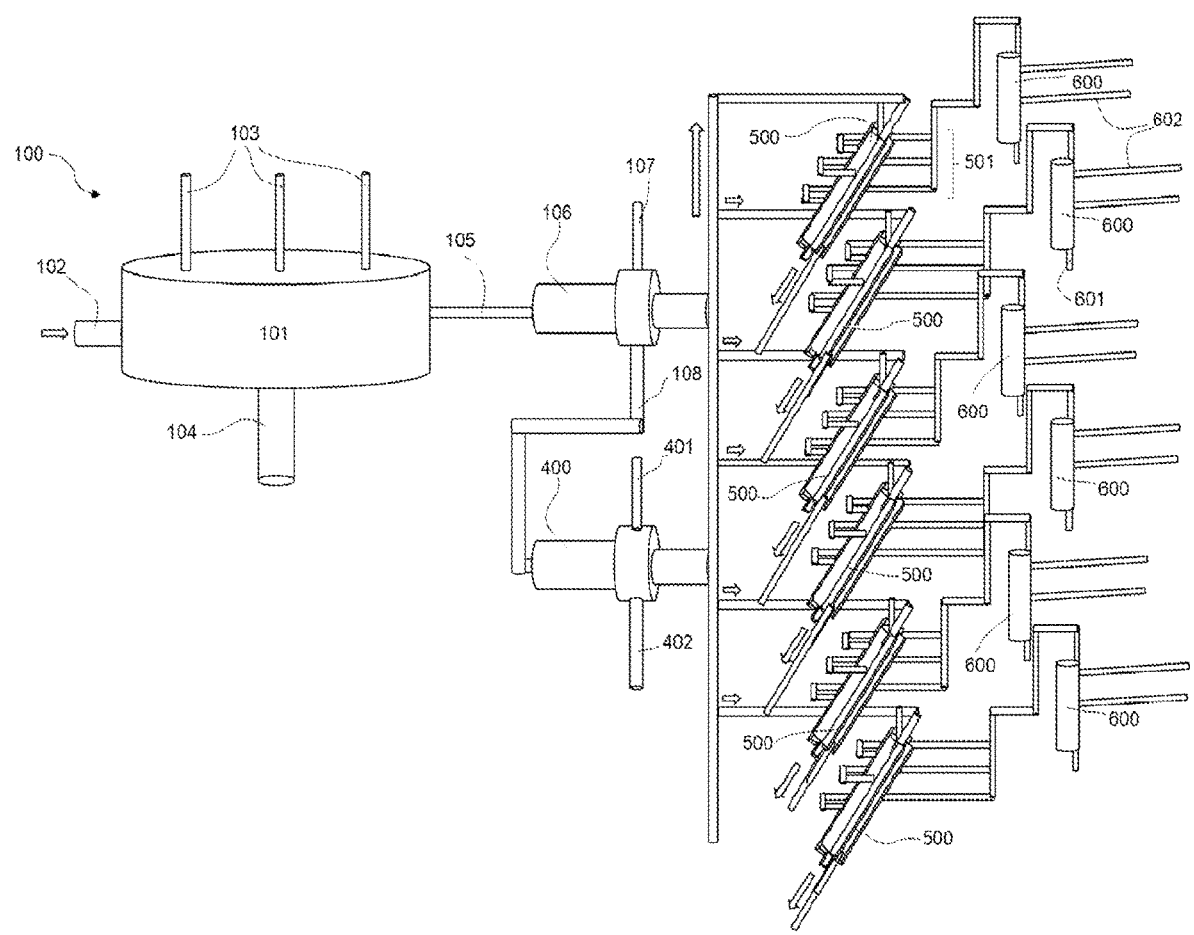
FIG. 6 shows an embodiment of the kinetic oil processing system with catalytic reforming units.

In some aspects, the system includes one or more catalytic reforming units configured to receive product from the distillation column. FIG. 6 shows an embodiment where product streams 501 from the distillation columns 500 feed into catalytic reforming units 600. The system 100 may comprise at least one catalytic reforming unit and in some aspects as plurality as pictured in FIG. 6. Heavier hydrocarbons exit the catalytic reforming units 600 through line 601 and are fed back into the top of a corresponding distillation column 500. A variety of product streams 602 withdraw product from the catalytic reforming units 600. In some aspects, the one or more catalytic reforming units 600 comprise a rotating drum that is configured to receive product from the distillation column 500 and compressed air.

Inside the catalytic reforming units 600 a high speed rotating drum receives product from the distillation column 500 being poured into the center using compressed air which is used to diffuse in a spiraling effect. Multi-headed, bio-directional nozzle tips are per the density of the liquid.

Figure 7:
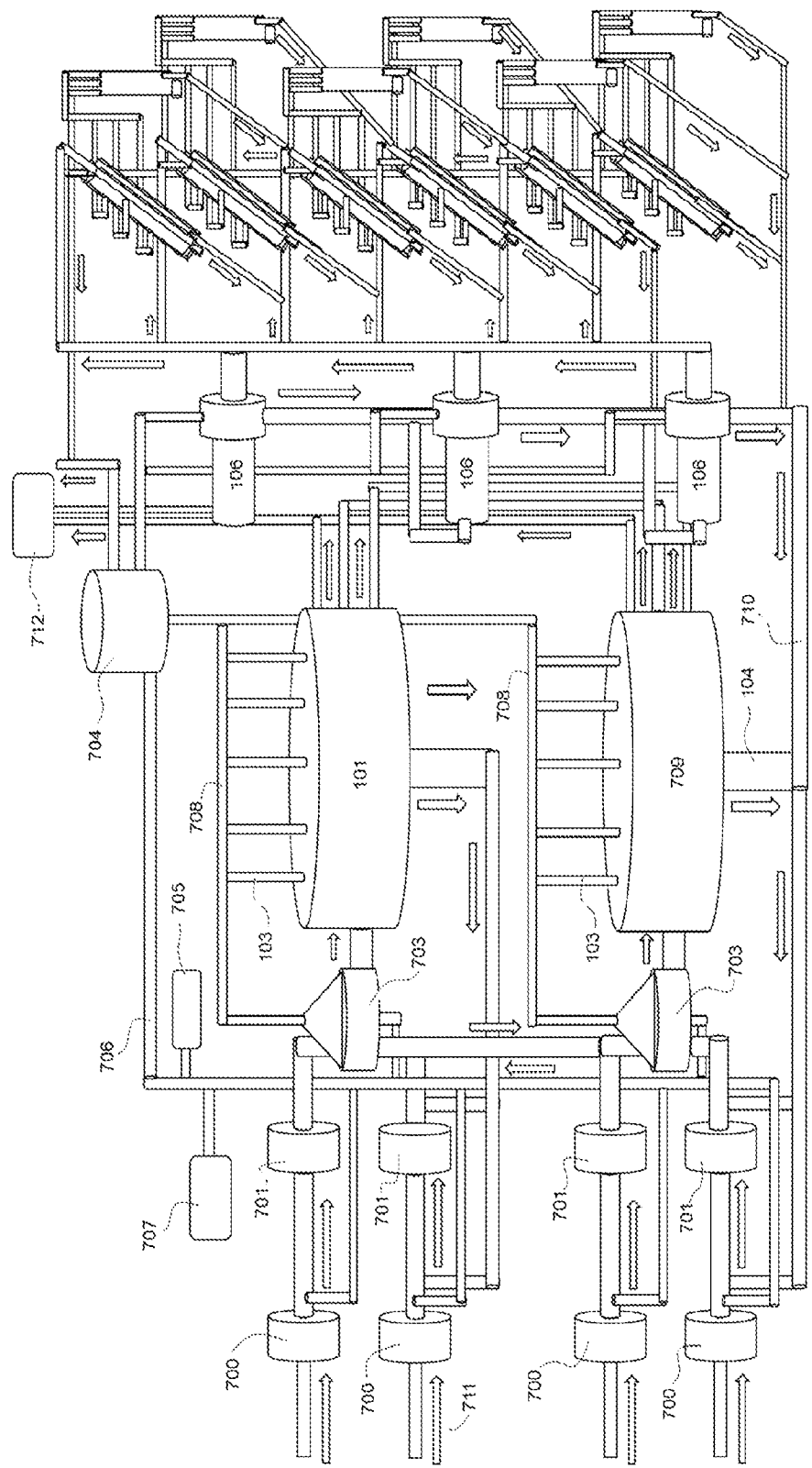
FIG. 7 shows an embodiment of the kinetic oil processing system.

FIG. 7 shows an embodiment of the system that includes a rod mill 700 and 701 connected to an inlet of a mixing unit 703. The first rod mill 700 may contain larger rods/balls for crushing oil shale and a second rod mill 701 may contain smaller rods/balls to further refine/crush the oil shale. Steam can be introduced into the petroleum or oil shale stream to heat up the material. FIG. 7 shows a steam circuit 706 connected to a boiler 705 for distributing and generating steam. In this embodiment, the steam can be introduced to the petroleum or oil shale after passing through the first rod mill 700. A steam engine 707 may be connected to the steam circuit 706 for generating mechanical power to operate other systems in the process.

The mixing unit 703 may be connected to an exhaust circuit 708 and to the steam circuit 706. From the mixing unit 703, the petroleum or oil shale is fed into a pressurized cracking tank 101. Mixers 703 may operate at variable speeds, with skimmers on top. Boiling water may be infused into the mixer 703. The top portion of the mixer 703 captures exhaust and delivers the exhaust to the exhaust circuit 708 through a pipe connect to the top portion of the mixer 703.

Once the pressurized cracking tank 101 is full or filled to a predetermined level, a second pressurized cracking tank 709 may receive the petroleum or oil shale. The embodiment shows first rod mils 700 and second rod mills 701 positioned in parallel. The pressurized cracking tanks 101 and 709 may be connected to a recirculation circuit 710.

The exhaust circuit 708 may use copper tubing and carry the exhaust to solar panels 712 to further heat the product upwards of 300° F. Exhaust pipes situated accordingly as the distilling process begins. Exhaust circuit pipes 708 may be embedded in the roof of the building housing the system on the inside next to the steel sheathing, which is adjacent to the solar panel 712.

The conduits connecting the units in the system may be triangular or rectangular in shape. In some aspects, the conduit comprises a top and a bottom, and the conduit is heated on the bottom. For example, a triangular pipe carrying oil shale may be heated on the bottom portion of the triangular pipe. The conduits may also be sloped at an angle to encourage flow of the petroleum or oil shale from one unit to the next. In some aspects, the conduits may be connected, at the top of the conduit, to the exhaust circuit.

The bottom of the conduits may be heated from exhaust product streams. Any recirculating stream could be used to contribute heat to any other unit in the system. For example, recirculating streams from the kilns may provide heat to the conduits before or after a rod mill.

In some aspects, the pipes may be conventional round pipes that rotate and are sloped. The pipes may contain internal fins that rotate to increase heat production through friction.

In some aspects, the pressurized cracking tank and the rotary kiln are at least partially encased in a thermal insulator. In some aspects, the thermal insulator is kyanite or mullite. In some aspects, kyanite/mullite is used to thermally insulate conduits, distillation columns, or kilns. Any unit or conduit in the system may be thermally insulated using kyanite and/or mullite.

A method of processing petroleum or oil shale is provided. The method includes feeding the petroleum or the oil shale into a pressurized cracking tank; heating the petroleum or the oil shale to withdraw oil vapors containing hydrocarbons; and feeding the petroleum or the oil shale from the pressurized cracking tank into a rotating kiln.

In some aspects, the method includes removing the petroleum or the oil shale from the kiln and feeding the petroleum or the oil shale into distillation column.

In some aspects, the method includes feeding a stream from the distillation column into a catalytic reforming unit.

In some aspects, a conduit connecting the pressurized cracking tank and the rotary kiln is a triangle pipe or a square pipe.

The present disclosure also describes an on-line unit and system for measuring, controlling, and/or optimizing one or more system parameters. Optimization can include, for example, measuring one or more properties associated with the petroleum or oil shale feed or product streams to be sure that the one or more properties are within an acceptable, predetermined range and, if the one or more properties are not within the acceptable, predetermined range for each respective property being measured, causing a change in the process to bring the property back within the acceptable, predetermined range.

In certain embodiments, the system includes a monitoring and controlling unit that comprises a controller and a plurality of sensors. Each of the plurality of sensors can be in communication with the controller. For example, if the unit comprises five sensors, each of the five sensors can be in communication with the controller.

As used herein, the term "controller" refers to a manual operator or an electronic device having components, such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components.

The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, and/or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components, such as a signal conditioner or system monitor, may be included to facilitate signal transmission and signal-processing algorithms.

In certain aspects, the controller includes hierarchy logic to prioritize any measured or predicted properties associated with system parameters. For example, the controller may be programmed to prioritize system temperature over pH, or vice versa. It should be appreciated that the object of such hierarchy logic is to allow improved control over the system parameters and to avoid circular control loops.

The monitoring and controlling unit may comprise a plurality of sensors, which are capable of analyzing the system and transmitting data regarding the feed streams and products streams to the controller. The plurality of sensors can comprise, for example, sensors for measuring flow rate, pH, volume, temperature, and density in feed or product streams and in process units. The monitoring and controlling unit may comprise any of these sensors, all of these sensors, a combination of two or more of these sensors, one or more additional sensors not specifically mentioned here, and the sensors may be in communication with the controller.

In certain embodiments, the monitoring and controlling system is implemented to have the plurality of sensors provide continuous or intermittent feedback, feed-forward, and/or predictive information to the controller, which can relay this information to a relay device, which can transmit the information via cellular communications to a remote device, such as a cellular telephone, computer, and/or any other device that can receive cellular communications. This remote device can interpret the information and automatically send a signal (e.g. electronic instructions) back, through the relay device, to the controller to cause the controller to make certain adjustments to the output of the pumps. Based upon the information received by the controller from the plurality of sensors or from the remote device, the controller may transmit signals to the various pumps to make automatic, real-time adjustments.

The sensors disclosed herein are operable to sense and/or predict a property associated with the system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities.

All of the systems and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a conduit" is intended to include "at least one conduit" or "one or more conduits."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A system for purifying petroleum or oil shale, comprising:
    a pressurized cracking tank configured to receive petroleum or crushed oil shale;
    a rotary kiln configured to receive product from the pressurized cracking tank; and
    one or more distillation columns having a top portion and a bottom portion, wherein the distillation column is configured to receive product from the rotary kiln at the top portion.

2. The system of claim 1, wherein the distillation column is on a 20 to 80 degree angle.

3. The system of claim 2, wherein the distillation column is on a 45 degree angle.

4. The system of claim 1, further comprising one or more catalytic reforming units configured to receive product from the distillation column.

5. The system of claim 4, wherein the one or more catalytic reforming units comprise a rotating drum that is configured to receive product from the distillation column and compressed air.

6. The system of claim 1, further comprising a rod mill connected to an inlet of the pressurized cracking tank.

7. The system of claim 6, wherein a mixer is positioned between the rod mill, a ball mill, or a sag mill and the inlet of the pressurized cracking tank.

8. The system of claim 1, wherein a conduit connects the pressurized cracking tank and the rotary kiln, wherein the conduit is a triangle pipe or a square pipe.

9. The system of claim 8, wherein the conduit comprises a top and a bottom, and the conduit is heated on the bottom.

10. The system of claim 9, wherein the bottom of the conduits are heated from exhaust product streams.

11. The system of claim 1, wherein the pressurized cracking tank and the rotary kiln are at least partially encased in a thermal insulator.

12. The system of claim 8, wherein the conduits are at least partially encased in a thermal insulator.

13. The system of claim 12, wherein the thermal insulator is kyanite or mullite.

14. The system of claim 11, wherein the thermal insulator is kyanite or mullite.

15. The system of claim 1, wherein the pressurized cracking tank comprises exhaust valves to control flow of vapor out of the pressurized cracking tank.

16. The system of claim 1, further comprising a ball mill connected to an inlet of the pressurized cracking tank.

17. The system of claim 1, further comprising a sag mill connected to an inlet of the pressurized cracking tank.

18. A method of processing petroleum or oil shale, comprising:
    feeding the petroleum or the oil shale into a pressurized cracking tank;
    heating the petroleum or the oil shale to withdraw oil vapors containing hydrocarbons;
    feeding the petroleum or the oil shale from the pressurized cracking tank into a rotating kiln; and
    removing the petroleum or the oil shale from the kiln and feeding the petroleum or the oil shale into distillation column.

19. The method of claim 18, further comprising feeding a stream from the distillation column into a catalytic reforming unit.

20. The method of claim 18, wherein a conduit connecting the pressurized cracking tank and the rotary kiln is a triangle pipe or a square pipe.

\* \* \* \* \*